United States Patent [19]

Mills, Jr. et al.

[11] Patent Number: 4,590,370
[45] Date of Patent: May 20, 1986

[54] EPITHERMAL NEUTRON DIE-AWAY LOGGING

[75] Inventors: William R. Mills, Jr., Duncanville; Linus S. Allen, Dallas, both of Tex.

[73] Assignee: Mobil Oil Corporation, New York, N.Y.

[21] Appl. No.: 632,354

[22] Filed: Jul. 19, 1984

Related U.S. Application Data

[63] Continuation-in-part of Ser. No. 487,541, Apr. 22, 1983, abandoned.

[51] Int. Cl.$^4$ .............................................. G01V 5/10
[52] U.S. Cl. .................................. 250/267; 250/269; 250/390
[58] Field of Search ............ 250/261, 267, 269, 390 R

[56] References Cited

U.S. PATENT DOCUMENTS

| | | | |
|---|---|---|---|
| 3,264,477 | 8/1966 | Hall, Jr. ........................... | 250/267 |
| 4,097,737 | 6/1978 | Mills, Jr. ........................... | 250/269 |
| 4,241,253 | 12/1980 | Allen et al. ....................... | 250/390 |
| 4,516,028 | 5/1985 | Riggan ............................... | 250/370 |

FOREIGN PATENT DOCUMENTS 127391 12/1984 European Pat. Off. ............ 250/269

Primary Examiner—Alfred E. Smith
Assistant Examiner—Constantine Hannaher
Attorney, Agent, or Firm—A. J. McKillop; Michael G. Gilman; George W. Hager, Jr.

[57] ABSTRACT

A borehole logging tool includes a pulsed source of fast neutrons and a neutron sensitive counter. A neutron filter encases the counter and has a thickness to permit the longest possible delay time following each burst of fast neutrons before epithermal neutrons from the irradiated formation are detected by the neutron counter while at the same time minimizing thermal neutron effects.

16 Claims, 7 Drawing Figures

EPITHERMAL NEUTRON DIE-AWAY LOGGING

CROSS-REFERENCE TO RELATED APPLICATION

This is a continuation-in-part application of Ser. No. 487,541, filed Apr. 22, 1983, abandoned, which is expressly incorporated herein by reference.

BACKGROUND OF THE INVENTION

This invention relates to radioactive well logging and more particularly to well logging processes and systems for irradiating subterranean formations under investigation with bursts of fast neutrons and characterizing the formation on the basis of the decay of the subsequently produced epithermal neutron population.

Various techniques may be employed in order to characterize subterranean formations with regard to their fluid or mineral content, lithologic characteristics, porosity, or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal neutrons employing two detectors at different spacings from the source or by measuring epithermal neutrons with a single detector.

In pulsed neutron logging procedures, the formations are irradiated with repetitive bursts of fast neutrons, normally neutrons exhibiting an energy greater than 1 Mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutrons is acquired as kinetic energy by the nucleus with which it collides. The remaining energy loss generally takes the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary, it is normally placed in the range of 0.1-1 electron volt. ($1eV = 1.60219 \times 10^{-19} J$)

The populations of neutrons at the various energy levels decay with time following primary irradiation and thus offer means of characterizing the formation. For example, in the case of elastic scattering, which predominates for energies between a few ev and about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a qualitative indication of the amount of hydrogenous material present which in turn may be indicative of the porosity of the formation.

For example, U.S. Pat. No. 4,097,737 to Mills discloses a method and system for epithermal neutron die-away logging utilizing a 14-Mev pulsed neutron source and a neutron detector that is sensitive to epithermal neutrons and highly discriminatory against thermal neutrons. The detector is relatively insensitive to the high energy neutrons and has a filter that renders it sharply insensitive to thermal neutrons.

SUMMARY OF THE INVENTION

The present invention is directed to a system for epithermal neutron die-away logging of subterranean formations surrounding a borehole. A source of fast neutrons irradiates the formations surrounding the borehole. A neutron counter detects primarily epithermal neutrons returning to the borehole from the irradiated formations. A neutron filter surrounds the neutron counter and has an optimum filter thickness so as to permit the longest possible delay time following each burst of fast neutrons from the neutron source before the epithermal neutrons from the irradiated formations are detected by the neutron counter, while at the same time optimizing the epithermal neutron counting rates with minimal thermal neutron effects.

DESCRIPTION OF THE PREFERRED EMBODIMENT

The present invention is directed to a new and improved neutron detector for use in epithermal neutron die-away porosity logging.

Figure 1:
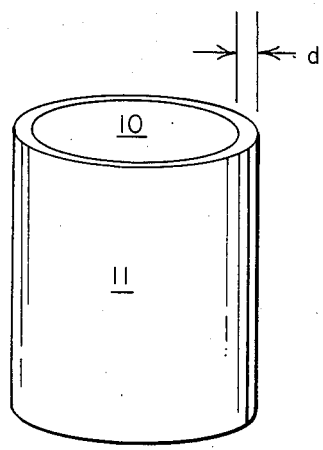
FIG. 1 illustrates the neutron detector surrounded by the neutron filter of the present invention.

Referring now to FIG. 1, an epithermal neutron detector includes a neutron-sensitive counter 10, preferably a proportional counter filled with helium-3 gas, surrounded by a neutron filter 11, preferably a thin layer of gadolinium. Such a detector can be employed in a system such as disclosed in the aforementioned U.S. patent to Mills for epithermal die-away porosity logging.

Figure 2:
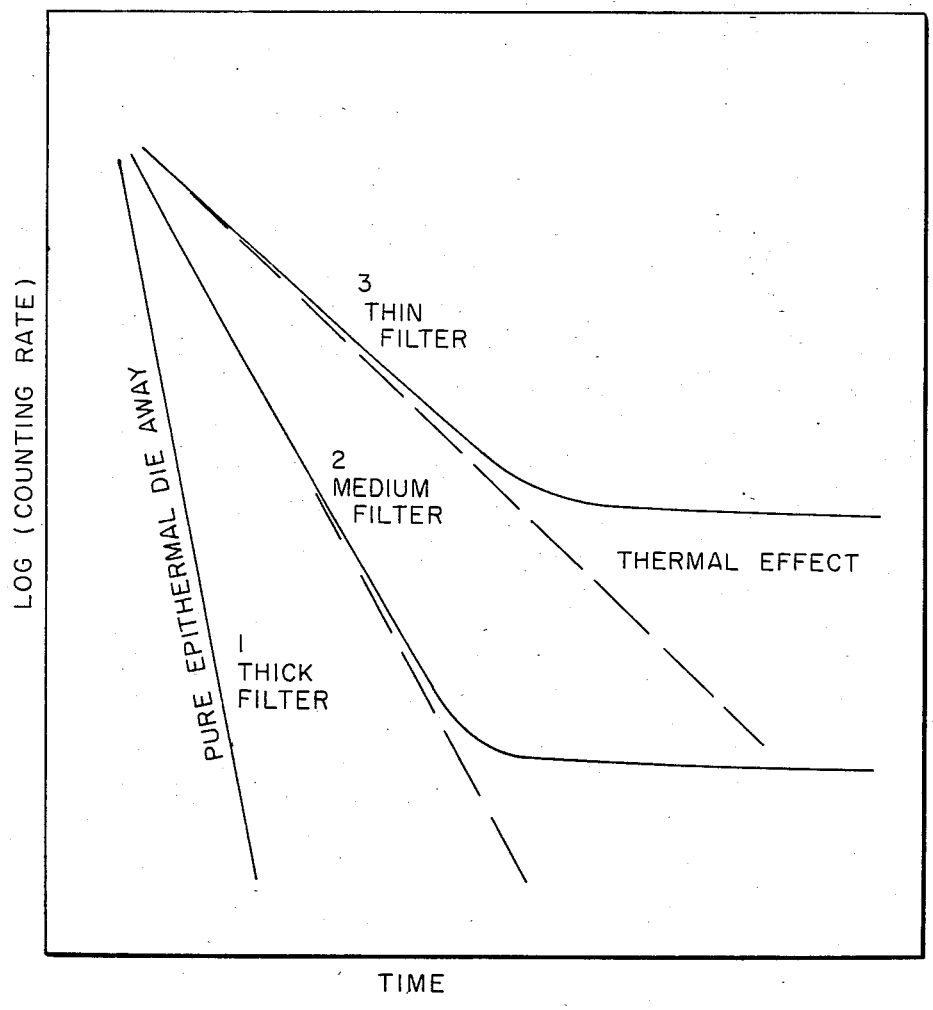
FIG. 2 illustrates counting rate curves for various neutron filter thicknesses.

More specifically the present invention is directed to an epithermal neutron detector in which the neutron filter 11 surrounding the neutron counter 10 is of optimum thickness to permit the longest possible delay time following each neutron burst before the epithermal neutrons are detected by the neutron counter 10, while at the same time maintaining (i) thermal neutron effects within an acceptable level and (ii) acceptable epithermal neutron counting rates. This will be more fully understood by referring to FIG. 2 which shows die-away curves obtained for a range of neutron filter thicknesses surrounding a given neutron counter when the formation being logged has a given porosity. The solid curves show the total observed response, which is the sum of the desired epithermal neutron response and the unwanted thermal neutron response. The dashed curves show only an epithermal response. Curve 1 is obtained with a thick filter surrounding the neutron counter, curve 2 is obtained with a medium filter, and curve 3 is obtained with a thin filter.

Of course, the terms thick, medium and thin are relative to one another and are material dependent. The point is that if the filter material is thick enough to produce a pure epithermal neutron decay, unwanted thermal neutrons are eliminated from the measurement and the curve 1 of FIG. 2 results. However, in this event the measurement time is undesirably short, making an accurate epithermal die-away measurement difficult to achieve. By utilizing a thinner filter, the measurement is spread over a longer time period. However, if too thin a filter is used, the unwanted contribution of thermal neutrons becomes too large and the desired epithermal die-away measurement is not achieved, as shown in curve 3 of FIG. 2. The present invention provides for an optimum compromise between these two conditions as shown in curves 1 and 3 so as to provide as nearly a pure epithermal die-away over as long a time period as is possible before the thermal neutron contribution becomes objectionably large. Such a compromise is shown in curve 2 of FIG. 2.

In the design of such an optimum filter thickness, two conditions need to be considered:

$$[\tau(t) - \tau_{epi}(t)]/\tau_{epi}(t) \leq \eta, \text{ and} \quad (1)$$

$$\text{Counting rate (t)/Counting rate (0)} \geq \rho \quad (2)$$

where:
$\tau(t)$ = observed neutron lifetime at time delay t,
$\tau_{epi}(t)$ = epithermal neutron lifetime at time delay t,
Counting rate (t) = counting rate at time delay t,
Counting rate (0) = counting rate at zero time delay,
$\eta$ = a dimensionless parameter, chosen to permit a given admixture of thermal neutron response, and
$\rho$ = a dimensionless parameter chosen to permit a given relative statistical precision.

The physical significance of the parameter $\eta$ may be seen as follows. The observed neutron lifetime $\tau$ is a function of both epithermal and thermal neutron properties of earth formations. We wish to maintain the dependence of $\tau$ on thermal neutron effects as low as is practical. The parameter $\eta$ is a quantitative measure of the degree to which thermal neutron effects will influence the observed neutron lifetime. For thick filters, $\tau \approx \tau_{epi}$ and $\eta$ will be very small. For thin filters, $\tau > \tau_{epi}$ and $\eta$ will be relatively large. In determining the optimum filter thickness, a value of $\eta$ is chosen that will be acceptable for the purpose of the measurement being made. In some cases a relatively large value of $\eta$ will be acceptable; in other cases a small value will be necessary.

The physical significance of the parameter $\rho$ is based on the fact that counting rates in at least two distinct time intervals must be measured in order to determine a lifetime $\tau$. Assuming the time intervals to be equal, the statistical precision within which $\tau$ can be determined depends primarily on the counting rate in the time interval that occurs latest in time following the burst from the neutron source. If we let t be the delay time corresponding to the beginning of the latest interval, then the ratio:

Counting rate (t)/Counting rate (0)

may be taken as a measure of the statistical precision of $\tau$. The above ratio is a function of t and depends on the detector/filter combination; its primary dependence is on filter characteristics. As with the parameter $\eta$, one chooses an operational value for $\rho$ based on observed die-away curves and on a knowledge of how "far down" a decay curve measurements can be made that are statistically useful.

The equality conditions of equations (1) and (2) are satisfied for given values of $\eta$ and $\rho$ at counting rate delay times $t_\eta$ and $t_\rho$. Filter thickness optimization can then be expressed as follows: for a given filter type, choose the filter thickness which maximizes the smaller of the delay times $t_\eta$ and $t_\rho$. The foregoing optimization criterion may be expressed mathematically by the following:

$$\text{Maximize } t_{min} = Sm(t_\eta, t_\rho) \quad (3)$$

where: $t_{min}$ has been defined as the smaller of $t_\eta$ and $t_\rho$.

The values of $t_\eta$ and $t_\rho$ will depend primarily on the filter type and thickness, $X_f$, and the values chosen for $\eta$ and $\rho$. Thus, for a given filter type $$t_\eta = f(X_f, \eta) \quad (4)$$

$$t_\rho = g(X_f, \rho) \quad (5)$$

where f and g represent functional dependence.

Figure 3:
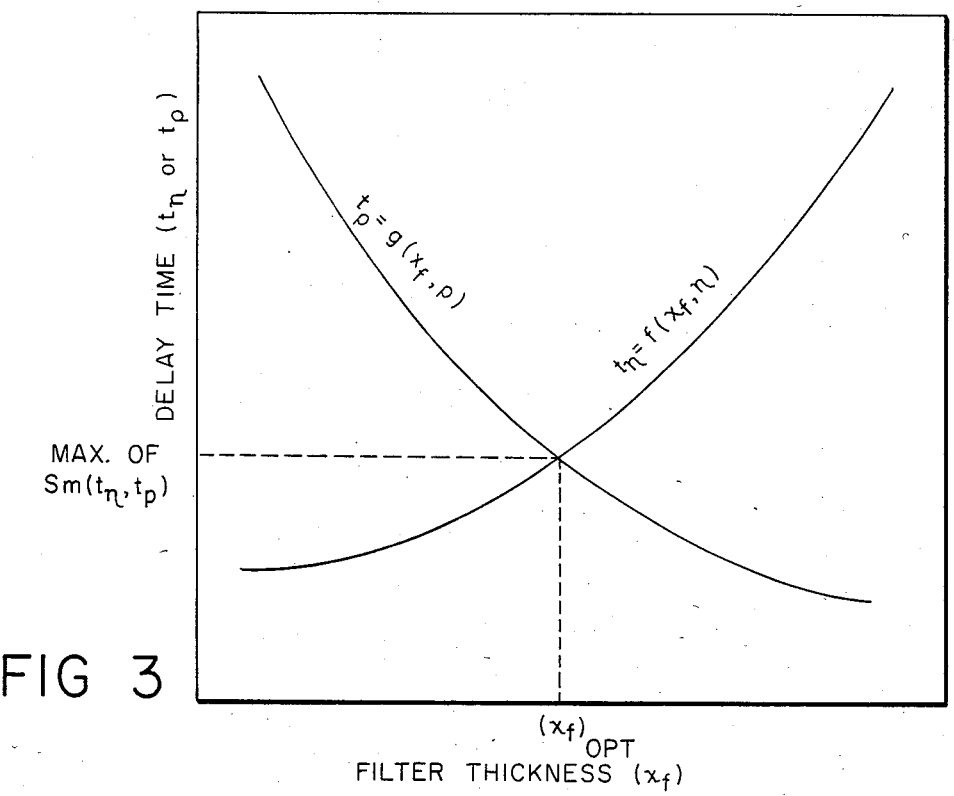
FIGS. 3 and 7 illustrate counting rate delay time curves for use in determining optimum neutron filter thickness.

For given values of $\eta$ and $\rho$, FIG. 3 shows the qualitative behavior of $t_\eta$ and $t_\rho$ as a function of $X_f$. The maximum of $Sm(t_\eta, t_\rho)$ occurs when $t_\eta$ equals $t_\rho$ and this condition results in a unique optimum value of filter thickness $(X_f)_{OPT}$.

An example of the foregoing described method for determining an optimum filter thickness will now be set forth for a helium-3 detector that is $\frac{1}{4}$ inch (6.3 mm) in diameter, 1 inch (25.4 mm) long and filled with helium-3 gas to a pressure of 10 atmospheres $(1.01 \times 10^6 N/M^2)$. The type of filter material selected for the example is gadolinium. Calculations were made to determine the time-dependent epithermal and total (epithermal plus thermal) relative counting rates for a range of gadolinium thickness $X_f$. Die-away curves such as those of FIG. 2 were obtained for each value of $X_f$. From these curves, values of $$\delta\tau(t) = [\tau(t) - \tau_{epi}(t)]/\tau_{epi}(t), \text{ and} \quad (6)$$

$$R(t) = \text{Counting rate (t)/Counting rate (0)} \quad (7)$$

were determined and plotted as a function of time, t. Note that $\delta\tau(t)$ and $R(t)$ are functions of t, in contrast to $\eta$ and $\rho$ which are parameters whose values have been selected. Thus, for each value of $X_f$ a pair of curves $\delta\tau$ and R was obtained. For selected values of $\eta$ and $\rho$ the plots of $\delta\tau$ and R were used to determine $t_\eta$ and $t_\rho$ that satisfy the conditions:

$$\delta\tau_\eta(t) \leq \eta, \text{ and} \quad (8)$$

$$R(t_\rho) \geq \rho. \quad (9)$$

Figure 4:
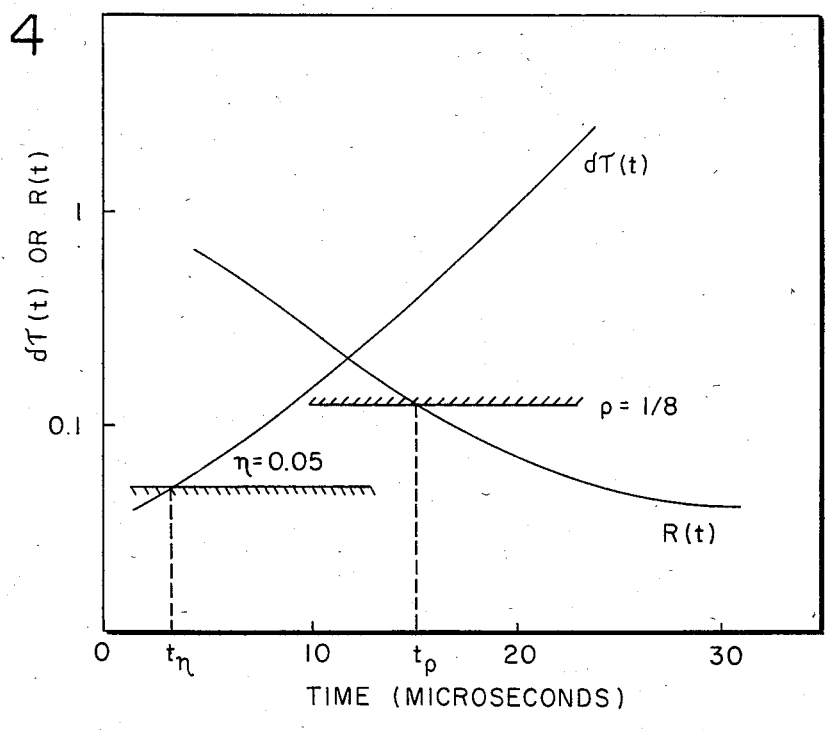
FIGS. 4-6 illustrate auxiliary curves derived from counting rate curves and used in determining optimum neutron filter thickness.
Figure 5:
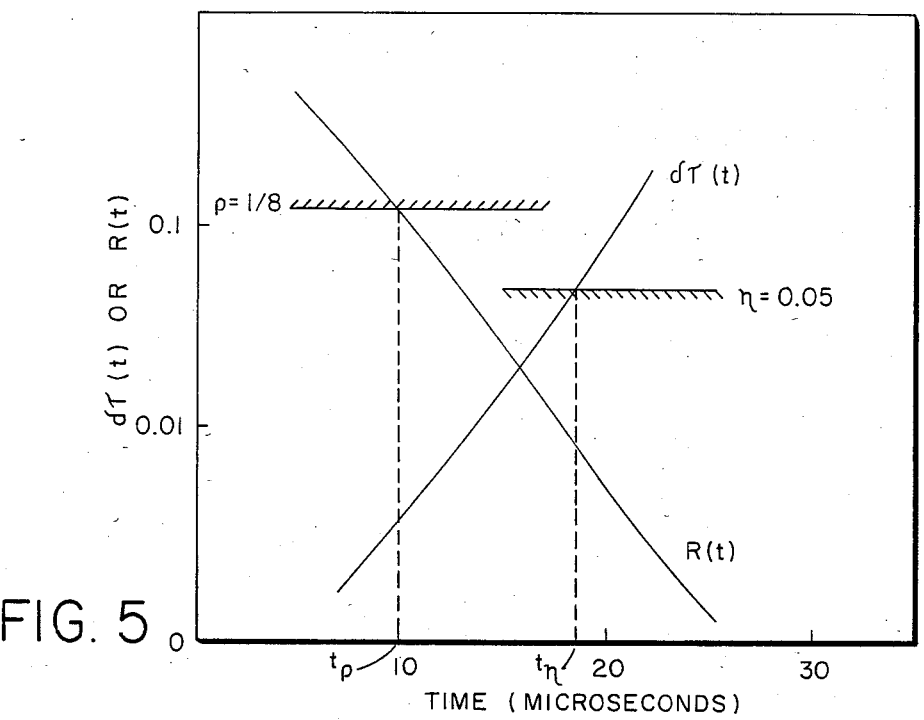
Figure 6:
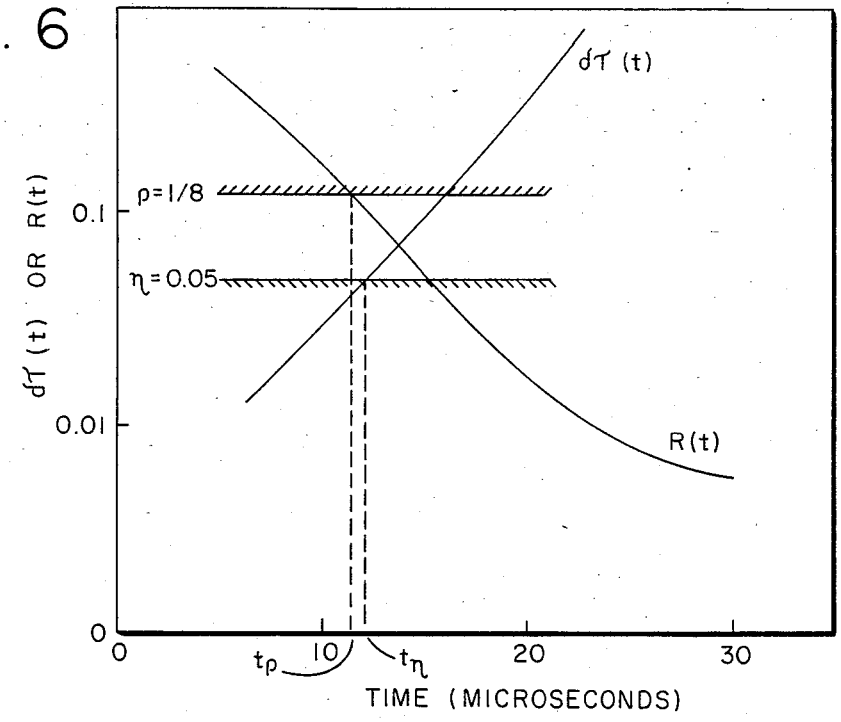

Plots of $\delta\tau(t)$ and R(t) are shown in FIGS. 4–6 for a typical case of a high-porosity sandstone formation. FIG. 4 is for a gadolinium thickness that is considerably thinner than optimum, FIG. 5 is for gadolinium that is considerably thicker than optimum, and FIG. 6 is for gadolinium of near optimum thickness. In this example, $\eta=0.05$ and $\rho=\frac{1}{8}$. The values $t_\eta$ and $t_{92}$ that are implied by equations (8) and (9) are indicated in the figures.

Figure 7:
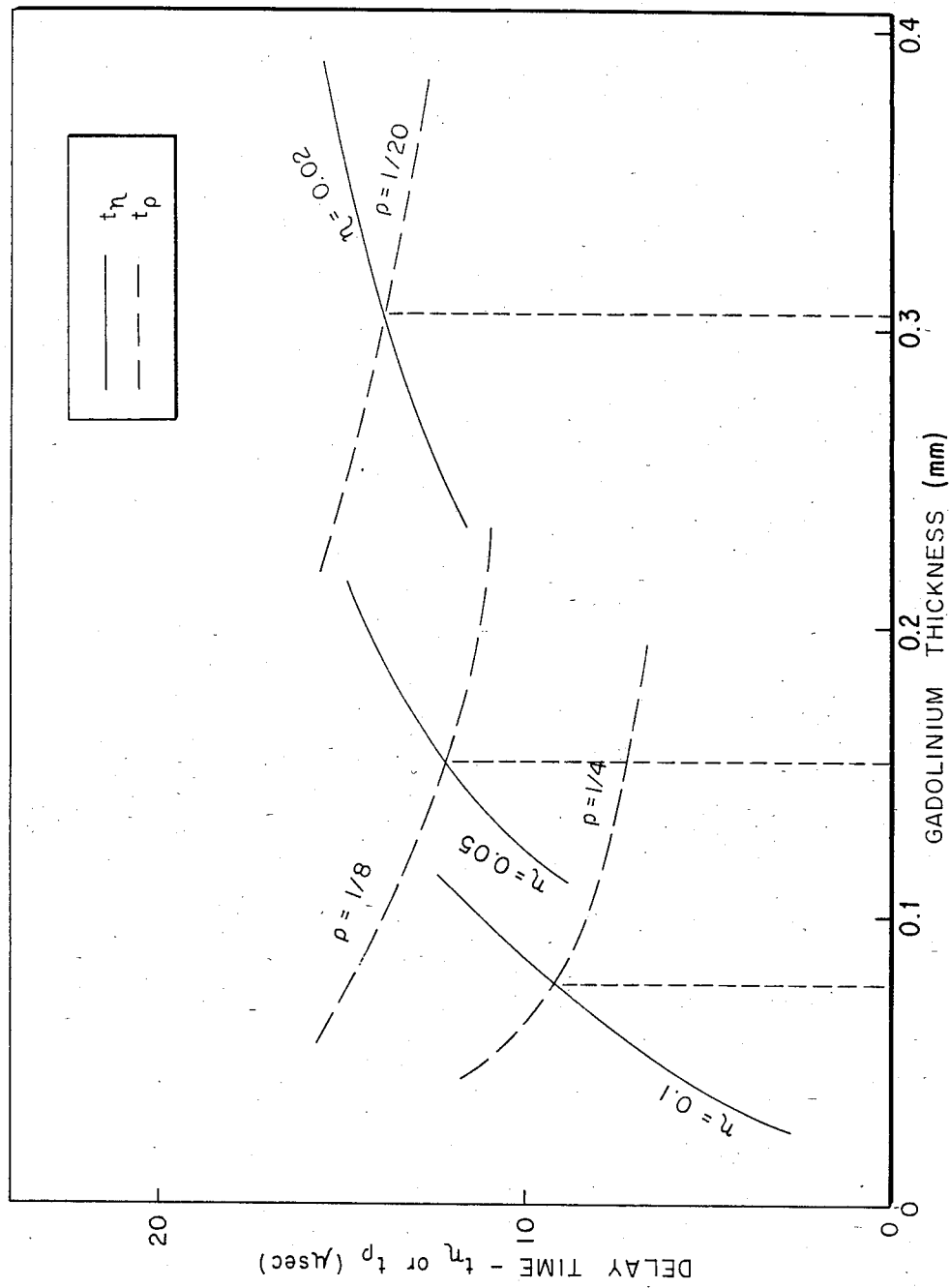

FIG. 7 shows plots of $t_\eta$ (solid line) and $t_\rho$ (dashed line) as a function of gadolinium thickness for three sets of values of $\eta$ and $\rho$:

| Set No. | $\eta$ | $\rho$ | $(X_f)_{OPT}$, mils (mm) |
|---|---|---|---|
| 1 | 0.10 | $\frac{1}{4}$ | 3 (0.0762) |
| 2 | 0.05 | $\frac{1}{8}$ | 6 (0.1524) |
| 3 | 0.02 | 1/20 | 12 (0.3048) |

The foregoing table shows the values obtained for the optimum gadolinium thickness in each set. Sets 1 and 3 are considered to be the extreme values of $\eta$ and $\rho$ for satisfactory epithermal die-away measurements. Set 2 is considered to be the best compromise for $\eta$ and $\rho$. Thus, for gadolinium, $(X_f)_{OPT}$ is in the range of 3 to 12 mils (i.e., 0.0762 mm to 0.3048 mm) with a preferred value of 6 mils (0.1524 mm).

It is to be understood that the foregoing merely describes the determination of the optimum filter thickness of gadolinium as one example. Other filter materials may be successfully utilized as well as an infinite variety of combinations of filter materials. For example, cadmium may be utilized as neutron filter material with a preferred thickness of from 0.003 inch (0.0762 mm) to 0.100 inch (0.3048 mm). Additionally, a combination of both gadolinium and cadmium may be utilized with preferred thickness of 0.003 inch to 0.012 inch for gadolinium and 0.003 inch (0.0762 mm) to 0.100 inch (2.5400 mm) for cadmium.

It is to be further understood that the present invention relates to the method of determining filter thickness that optimizes epithermal die-away measurements and that modifications or alterations may be made without departing from the spirit and scope of the invention as set forth in the appended claims.

We claim:

1. A system for epithermal neutron die-away logging of subterranean formations surrounding a borehole comprising:
   (a) a source of fast neutrons, for irradiating the formations surrounding a borehole,
   (b) a neutron counter for counting epithermal neutrons returning to the borehole from said irradiated formations,
   (c) a neutron filter surrounding said neutron counter having a thickness so as to permit the longest possible delay time following each burst of fast neutrons from said source before said epithermal neutrons from the irradiated formations are detected by said neutron counter while at the same time optimizing the epithermal neutron counting rates by minimizing thermal neutron effects.

2. The epithermal neutron die-away logging system of claim 1 wherein the thickness for said neutron filter is such that the following are satisfied in an optimum sense:

$$[\tau(t)-\tau_{epi}(t)]/\tau_{epi}(t) \leq \eta, \text{ and}$$

$$\text{Counting rate (t)/Counting rate (0)} \geq \rho$$

where:
- $\tau(t)$ = observed neutron lifetime at time delay t,
- $\tau_{epi}(t)$ = epithermal neutron lifetime at delay time t,
- Counting rate (t) = counting rate at time delay t,
- Counting rate (0) = counting rate at zero time delay,
- $\eta$ = a dimensionless parameter chosen to permit a given admixture of thermal neutron response, and
- $\rho$ = a dimensionless parameter chosen to permit a given relative statistical precision.

3. The epithermal neutron die-away logging system of claim 2 wherein optimization of the thickness of said neutron filter is satisfied by the following:

$$\text{Maximize } t_{min} = \text{Sm } (t_\eta, t_\rho)$$

where:
- $t_{min}$ is defined to be equal to the smaller of times $t_\eta$ and $t_\rho$, and where:
- $t_\eta$ = delay time for which $(\tau-\tau_{epi})/\tau_{epi}=\eta$, and
- $t_\rho$ = delay time for which Counting rate (t)/Counting rate (0) = $\rho$.

4. The method of claim 3 where $\eta$ is in the range of 0.02 to 0.10 and $\rho$ is in the range of 1/20 to $\frac{1}{4}$.

5. The method of claim 3 wherein said neutron filter comprises gadolinium with a thickness of from 0.003 inch (0.0762 mm) to 0.012 inch (0.3048 mm).

6. The method of claim 3 wherein said neutron filter comprises cadmium with a thickness of from 0.003 inch (0.0762 mm) to 0.100 inch (2.5400 mm).

7. The method of claim 3 wherein said neutron filter comprises a combination of gadolinium with a thickness of from 0.003 inch (0.0762 mm) to 0.012 inch (0.3048 mm) and cadmium with a thickness of from 0.003 inch (0.0762 mm) to 0.100 inch (2.5400 mm).

8. An epithermal neutron detector, comprising:
   (a) neutron-sensitive counter, and
   (b) a neutron filter encasing said counter having an optimum thickness which provides for a counting rate delay time corresponding to a selected lower limit for statistical precision of epithermal die-away measurements, said delay time being equal to a counting rate delay time corresponding to a selected upper limit for thermal neutron effects.

9. The epithermal neutron detector of claim 8 wherein said neutron filter comprises gadolinium.

10. The epithermal neutron detector of claim 9 wherein the thickness of said gadolinium neutron filter is at least 0.003 inch (0.0762 mm).

11. The epithermal neutron detector of claim 9 wherein the thickness of said gadolinium neutron filter is no greater than 0.012 inch (0.3048 mm).

12. The epithermal neutron detector of claim 8 wherein said neutron filter comprises cadmium.

13. The epithermal neutron detector of claim 12 wherein the thickness of said cadmium neutron filter is at least 0.003 inch (0.0762 mm).

14. The epithermal neutron detector of claim 12 wherein the thickness of said cadmium neutron filter is no greater than 0.100 inch (2.5400 mm).

15. The epithermal neutron detector of claim 8 wherein said neutron filter comprises both gadolinium and cadmium.

16. The epithermal neutron detector of claim 15 wherein the thickness of said gadolinium is from 0.003 inch (0.0762 mm) to 0.012 inch (0.3048 mm) and the thickness of said cadmium is from 0.003 inch (0.0762 mm) to 0.100 inch (2.5400 mm).

* * * * *